United States Patent [19]

Hughes

[11] Patent Number: 4,462,109

[45] Date of Patent: Jul. 24, 1984

[54] RECEIVER FOR PHASE-SHIFT MODULATED CARRIER SIGNALS

[75] Inventor: William C. Hughes, Scotia, N.Y.

[73] Assignee: General Electric Company, Schenectady, N.Y.

[21] Appl. No.: 406,133

[22] Filed: Aug. 9, 1982

[51] Int. Cl.³ .................. H04L 27/06; H03D 3/22
[52] U.S. Cl. ............................ 375/97; 375/83; 375/119; 329/124
[58] Field of Search .............. 375/77, 81, 83, 97, 375/119, 120; 329/50, 107, 122, 124; 455/203, 208, 209, 257, 260; 307/262

[56] References Cited

U.S. PATENT DOCUMENTS

4,143,322 3/1979 Shimamura ............... 329/124
4,409,562 10/1983 Kurihara ................... 329/50

Primary Examiner—Benedict V. Safourek
Attorney, Agent, or Firm—Paul J. Checkovich; James C. Davis, Jr.; Bernard J. Lacomis

[57] ABSTRACT

A receiver for recovering digital data from a phase-shift modulated carrier in a data communications system, wherein the length of the message preamble is insufficient to permit synchronous detection, divides the received signal into two channels. The channels having the larger and smaller signals are selected as the data and the servo channel, respectively. The output of the servo channel is utilized to control the local oscillator frequency in order to provide for synchronous detection during at least a part of the message data.

15 Claims, 8 Drawing Figures

RECEIVER FOR PHASE-SHIFT MODULATED CARRIER SIGNALS

BACKGROUND OF THE INVENTION

The present invention relates to digital communication receivers, and, more particularly, to a novel digital communications receiver for recovering data which has been phase-shift modulated onto a communications system carrier waveform.

It is known that digital information may be transmitted in a communications system by phase-shift modulation, wherein the phase of a carrier waveform is inverted, i.e. shifted by 180°, during each bit time interval in which a first binary data value is to be transmitted, and is maintained with the same phase as the immediately preceding bit time interval when the remaining binary data value is to be sent in a particular bit time interval. Alternatively, one phase may represent one binary data value and the 180° shifted phase the second binary data value. It is also known that digital information may be transmitted over powerlines between a central facility and a multiplicity of remote locations tied to the power distribution network. Powerline communication systems of this type are disclosed and claimed in U.S. Pat. Nos. 3,973,087 and 3,973,240, both issued Aug. 3, 1976; U.S. Pat. No. 3,944,723 issued Mar. 16, 1976; U.S. Pat. No. 4,135,181, issued Jan. 16, 1979; and U.S. Pat. No. 4,161,720, issued July 17, 1979, all assigned to the assignee of the present application and all incorporated herein in their entirety for reference. In powerline communication systems, wherein a powerline frequency (typically 60 Hertz (Hz) in the United States) signal is present throughout the entire system, it is known that the signal-to-noise ratio of the received signal can be greatly improved if the transmitted carrier signal frequencies are odd multiples of the first sub-harmonic, i.e. 30 Hz, of that powerline frequency. Methods and apparatus for realizing such improvements in signal-to-noise are described and claimed in U.S. Pat. No. 4,101,834, issued July 18, 1978; and U.S. Pat. No. 4,109,204, issued Aug. 22, 1978, both assigned to the assignee of the present application and incorporated herein by reference in their entirety.

In a data communications system in which the carrier is continuously present, even when the carrier is not modulated to transmit digital data to a receiving location, one presently known receiver for filtering out both systematic pulse and random noise to improve the signal-to-noise ratio is described and claimed in U.S. Pat. No. 3,944,932, issued Mar. 16, 1976, to the assignee of the present invention and incorporated herein by reference in its entirety. The receiver of U.S. Pat. No. 3,944,932 utilizes at least one narrow band-pass commutating filter preceded by at least one carrier-amplitude-limiting stage. The commutating filter requires a large number of precision resistance and capacitance elements having relatively high cost, and also requires careful adjustment of a number of control elements during assembly, further adding to production cost. A receiver having high rejection of undesirable signals, but also having a relatively low production cost, is highly desirable.

In another known receiver, described and claimed in U.S. Pat. No. 4,298,986, issued Nov. 3, 1981, and assigned to the assignee of the present invention and incorporated herein in its entirety for reference, an improved signal-to-noise ratio is achieved, inter alia, by providing a phase-locked loop to generate a loop signal having a frequency essentially locked to the received carrier frequency, whereby synchronous detection is effected.

In some communication systems, there may be insufficient time in the message preamble, i.e. time between first bit of message received and first intelligence data bit of message received, to permit a local oscillator or loop signal to be phase-locked or synchronized to the received carrier fequency prior to the arrival of the first bit of intelligence data which must be correctly decoded, thus making synchronous detection, the optimum technique for reducing the signal-to-noise ratio, impossible.

Where it is not possible to provide synchronous detection for 180° phase shift modulated signals, a differential phase shift detection scheme has been used. In differential phase shift keying (DPSK) detection, each bit of data is compared to a stored replica of the previously transmitted data bit to determine whether the relative phase therebetween is the same or shifted 180°. This bit-by-bit comparison has a number of disadvantages. The limiting signal-to-noise ratio is degraded because the comparison is made against a noisy reference, i.e. the previous bit, rather than against a noise-free reference as is possible with synchronous detection. Further, differential phase shift detection is subject to errors which are more difficult to detect by error detection codes. It is not uncommon, in low signal-to-noise ratio systems using differential decoding, for the received data bit string to become inverted, i.e. transposed 180° from the transmitted signal, and to remain so for the rest of the message. If this reversal occurs at certain key bits, determined by the type of error detection code used, the message may be accepted as correct. An error detection code may have a plurality of these key bits, increasing the chance of an unacceptably high number of erroneous messages being determined to be correct when differential decoding is used.

Most of the noise in the system is from harmonics of the powerline frequency. Thus, the receiver must be capable of maintaining harmonic rejection of these frequencies.

An object of the present invention is to provide a receiver capable of receiving messages in which the message preamble is of insufficient duration to permit a local oscillator signal to be synchronized with the received signal for synchronous detection while maintaining harmonic rejection.

Another object is to provide a receiver wherein the signal-to-noise ratio is increased over a receiver employing a differential phase shift detection technique.

SUMMARY OF THE INVENTION

In accordance with the present invention, a receiver for recovering digital data which has been phase-shift-modulated onto a carrier waveform in a digital communication system includes a relatively wide bandpass filter having an output providing a bandpass-filtered modulated carrier signal.

Mixing means are provided for mixing the bandpass-filtered modulated carrier signal with first and second local oscillator signals, which are in quadrature phase relationship with respect to each other, to form first and second recovered modulation signals respectively. The larger of the recovered modulation signals is selected as the data signal and the smaller as the servo signal. The servo signal is multiplied by the data signal and the resulting servo control signal is provided to a local oscillator frequency control means for varying the frequency of the local oscillator signals in response to the servo control signal. The data signal is supplied to a polarity restoration means which provides a recovered data signal having the same logic sense as the digital data modulated upon the carrier waveform.

In a presently preferred embodiment, all required frequencies establishing the timing sequences and operation of the receiver are generated by frequency-arithmetic techniques.

The features of the invention believed to be novel are set forth with particularity in the appended claims. The invention, itself, however, both as to organization and method of operation, together with further objects and advantages thereof, may best be understood by reference to the detailed description taken in connection with the accompanying drawing.

DETAILED DESCRIPTION

Figure 1A:
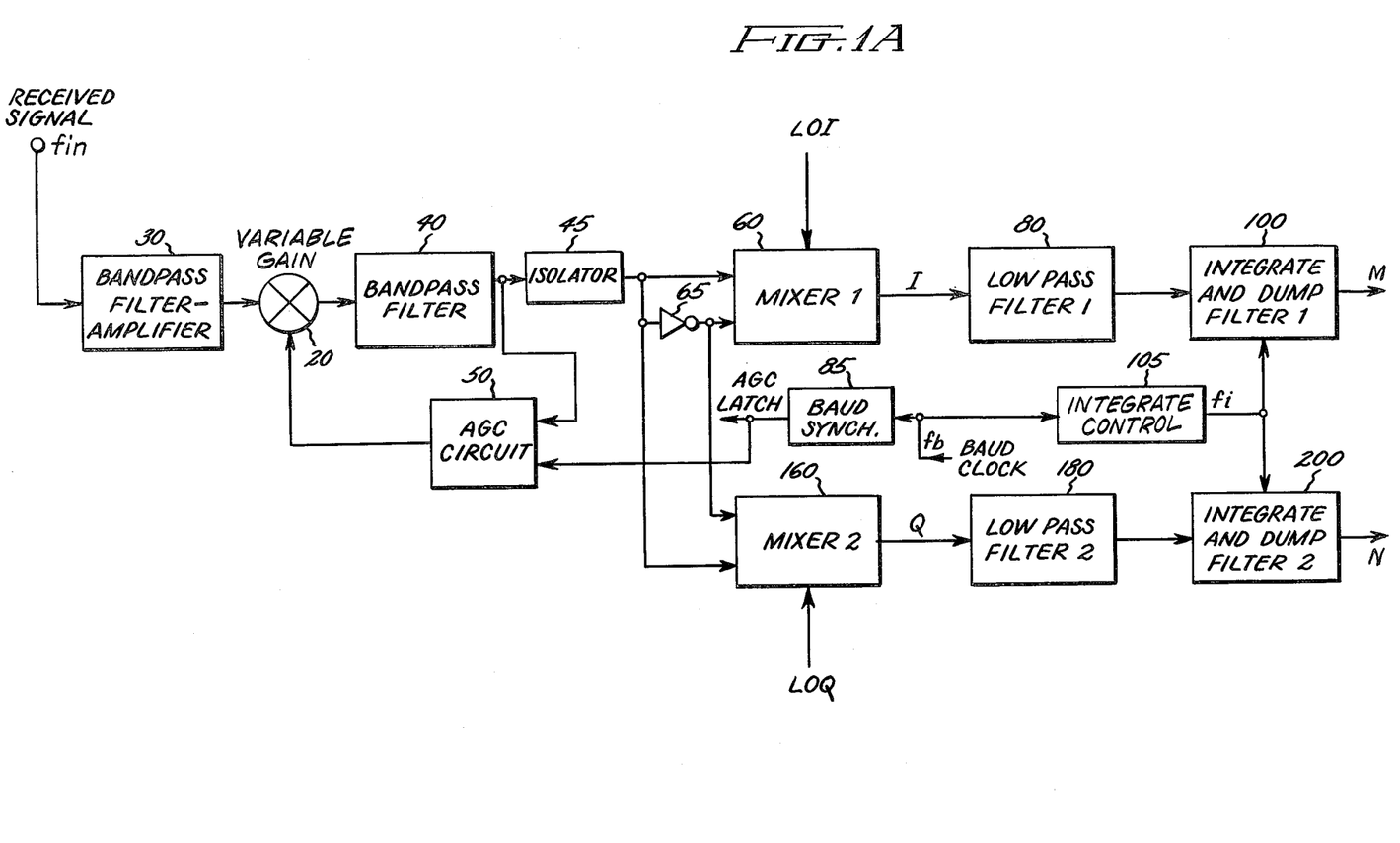
FIGS. 1A and 1B are a block diagram of a receiver fabricated in accordance with the principles of the present invention.
Figure 1B:
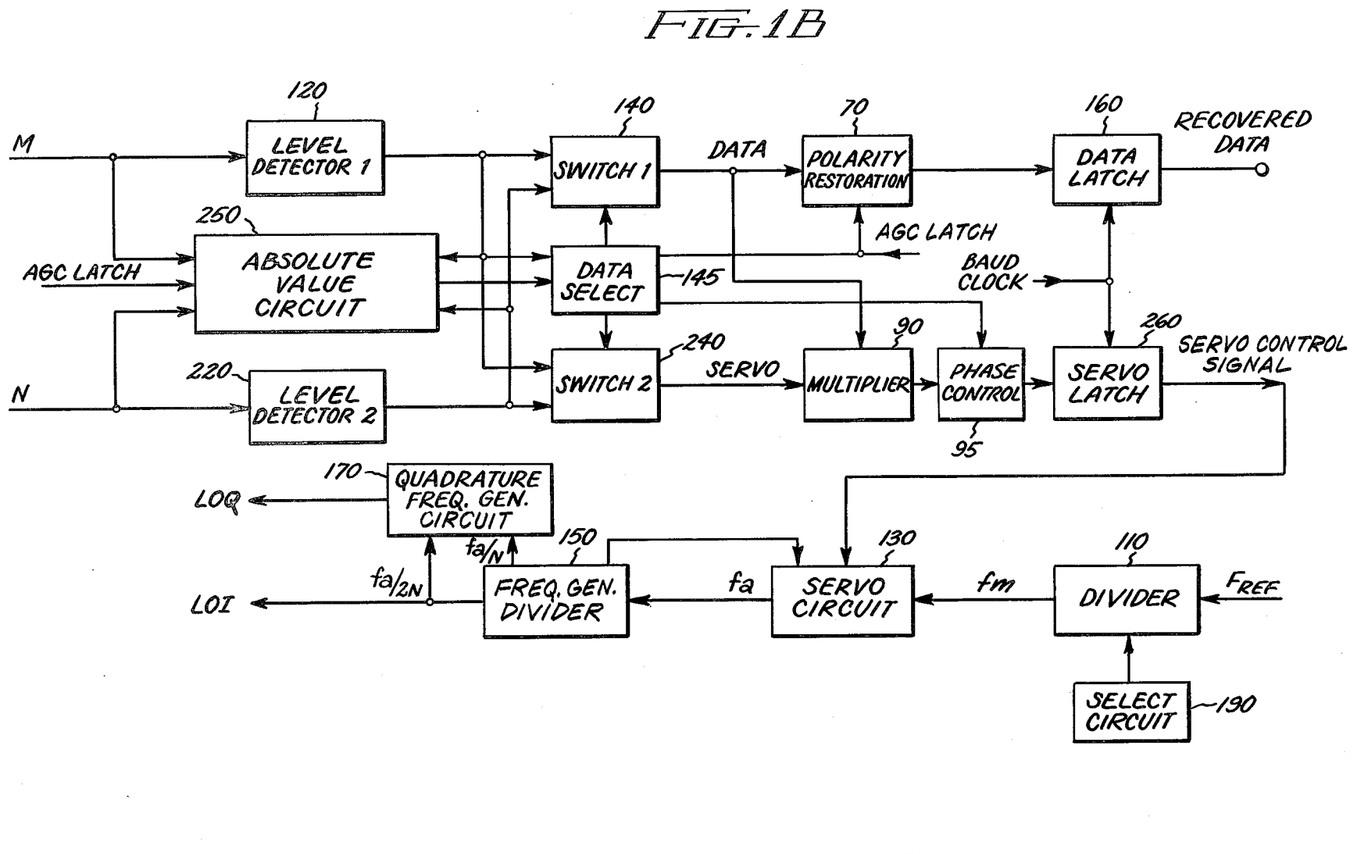

Referring now to FIGS. 1A and 1B, and to FIGS. 2–7 for additional circuit details, a presently preferred embodiment of my digital communication system receiver for recovering digital data which is 180° phase-shift-modulated onto a carrier waveform is illustrated.

The carrier, which may or may not be continuously present, is transmitted at a selected frequency $f_{in}$. The carrier or input frequency is advantageously integrally related to a system-wide frequency; in a powerline communication system, the input frequency advantageously will be an odd integer multiple of the powerline frequency first sub-harmonic. For purposes of illustration, the nominal 60 Hz powerline frequency $f_L$ may be utilized as the system wide frequency and the carrier frequency $f_{in}$ then equals $(2N+1)(f_L/2)$, where N is a non-negative integer. For example, if N=105, the nominal carrier frequency is 6630 Hz. It should be understood that the system-wide frequency may vary, e.g. the variation of the powerline frequency might, in some instances, be between lower and upper limits of 59.9 and 60.1 Hz, respectively, and that the carrier frequency advantageously is locked to the instantaneous value of the system-wide frequency and tracks the variations therein.

The carrier frequency waveform is advantageously modulated by shifting the phase thereof 180° whenever a transition in the modulating data bit stream occurs, e.g. from a first binary data value to a second binary data value, or vice-versa. The digitally modulated, i.e. 180° phase-shift-modulated, transmitted carrier frequency waveform signal is coupled to a bandpass filter-amplifier 30 of the receiver of FIGS. 1A and 1B from a transmission medium, e.g. a powerline. The gain of filter-amplifier 30 is selected such that the signal at its output is not saturated at the highest amplitude level of signal expected to be received by the amplifier. The bandpass filter characteristics of filter-amplifier 30 are those of a relatively wide-band filer having the desired center frequency, e.g. 6630 Hz and 60 dB attenuation at a frequency of approximately three times the center frequency. Rejection of strong signals near the center frequency can be improved by making the characteristics of filter amplifier 30 narrower, e.g. 20 dB attenuation at 360 Hz from center frequency.

The output of bandpass filter amplifier 30 is connected to a first input of a gain control circuit 20. A second input of gain control 20 is connected to the output of an AGC circuit 50. Gain control means 20 acts to maintain the received signal level at a value which will constitute a relatively constant and nonsaturating output signal thereof, thereby assuring that the maximum signal which can be conditioned by a bandpass filter means 40 without saturation will be supplied to the input of bandpass filter means 40.

The output of bandpass filter 40 is coupled to the input of an isolator 45 which acts as a buffer between bandpass filter means 40 and first and second mixer means 60 and 160, respectively, to prevent any spurious signals produced by the mixers from coupling back into the output of bandpass filter 40.

An automatic gain control (AGC) circuit 50 is provided to assure usage of the maximum second bandpass-filtered modulated carrier signal available at the input of bandpass filter 40 without saturating the filter. The output of bandpass filter 40 is coupled to a first input of AGC circuit 50. By coupling the output of AGC circuit 50 to the second input of gain control circuit 20, control over gain control output signal available at the output of gain control circuit 20 is provided.

The output of isolator 45 is coupled to first inputs of first and second mixer means 60 and 160, respectively, and to second inputs of first and second mixer means 60 and 160, respectively, through an analog signal inverter 65.

A third input of first mixer means 60 is coupled to the output of a servo circuit 130 through a divider circuit 150 providing the local oscillator LOI signal. A third input of second mixer means 60 is coupled to the output of quadrature frequency generating circuit 170 providing the local oscillator LOQ signal.

Local oscillator signals LOI and LOQ, which are nominally at the carrier frequency, are in quadrature, or 90° out of phase, with respect to each other and act as switch control signals in first and second mixer means 60 and 160, respectively, to provide either the buffered bandpass filtered signal from isolator 45 or the inverted buffered bandpass signal from inverter 65 to the output of first and second mixer means 60 and 160, respectively.

When the local oscillator signals LOI and LOQ are a logic level low, the buffered bandpass filtered signal from isolator 45 is coupled to the output of first mixer means 60 and the inverted buffered bandpass filtered signal from inverter 65 is coupled to the output of second mixer means 160. When the local oscillator signals LOI and LOQ are a logic level high, the inverted buffered bandpass filtered signal from inverter 65 is coupled to the output of first mixer means 60 and the buffered bandpass filtered signal from isolator 45 is coupled to the output of second mixer means 160. This coupling is provided because in the channel selected as the data channel, it is desired to have the level switching of the local oscillator signal LOI or LOQ, which is a digitally encoded signal, occur simultaneously with the zero crossing of the buffered or inverted buffered bandpass signal, which is an analog signal, typically a sine wave. In the channel selected as the servo channel, it is desired to have the level switching of the local oscillator signal LOI or LOQ occur at the peak (90°) and trough (270°) of the buffered or inverted buffered bandpass signal. Thus the output waveform of the mixer means in the channel selected as the data channel will appear as a scalloped signal wherein a 180° section of the sine wave between zero crossings is inverted. The output waveform of the mixer means in the channel selected as the servo channel will appear as an "S" curve, similar to a conventional phase discriminator output.

The outputs of mixers 60 and 160 are coupled to the inputs of first and second lowpass filters 80 and 180, respectively, each having a filter characteristic selected to pass the difference frequency or base-band signal from first and second mixer means 60 and 160, respectively, and to attenuate the sum and all higher frequencies from first and second mixer means 60 and 160, respectively. First and second mixer means 60 and 160 may each be an essentially linear mixer such as is disclosed in U.S. Pat. No. 4,298,986.

Whatever the phase of the received RF may be, one of the two channels I or Q, will have a signal which is within 45° of an in phase or 180° out of phase condition and thus have an absolute magnitude greater than or equal to $1/\sqrt{2}$ times the signal that would be obtained if the carrier were in-phase with the local oscillator, which in-phase relationship exists for synchronous detection. Since noise in a channel does not depend upon the phase relationship of the local oscillator to the carrier, the signal-to-noise ratio in the better channel will be within $-3$ dB (or 20 log $1/\sqrt{2}$) of the maximum which can be obtained by having the local oscillator and carrier in phase. Thus, if the channel with the larger signal is selected as the data channel, only a maximum of 3 dB in the ratio of signal-to-noise will be lost with respect to synchronous detection. Actually the loss will be less than 3 dB with respect to differential phase shift keying (DPSK) detection because DPSK detection loses 1-2 dB of signal-to-noise ratio in the region of most interest, i.e. low signal-to-noise ratios, because of the aforementioned technique of comparison with a previously stored noisy bit. Thus the actual loss of signal-to-noise ratio using the receiver of the present invention over a receiver employing a DPSK detection technique is only 1-2 dB. While this loss may be experienced with the first several bits of a message detected with the present receiver, the servo action on the local oscillator, as herein after described, will more than compensate for this loss on a total message comparison basis.

First and second lowpass filter means 80 and 180, respectively, are identical and include corresponding equivalent components. First and second integrate and dump (I&D) filters 100 and 200, coupled to the outputs of low pass filters 80 and 180, are identical and likewise include corresponding equivalent components.

An integrate control signal $f_i$ is synchronized to the baud clock signal $f_b$ supplied by a synchronizing means or sending control unit (not shown) as hereinafter explained, and is available at the output of an integrate control circuit 105. Integrate control circuit 105 supplies the integrate control signal $f_i$ to I&D filter 100 at a frequency which is one-half the baud clock signal $f_b$ frequency. Baud clock signal $f_b$ frequency is typically 30 Hz and thus the integrate control signal $f_i$ frequency is 15 Hz. I&D circuit 100 is designed so as not to saturate on the largest bandpass filtered modulated carrier output signal available at the output of bandpass filter 40 during the integrate time of 1/30 second. Any frequency component with a period of 1/30 second will integrate to zero at the end of the integrate time and therefore will not produce an output signal. Thus all harmonics of the power frequency tend to be removed by I&D filter 100. The integration time of I&D filter 100 is determined by the frequency of signal $f_i$.

The output of first I&D filter 100 is coupled to the input of a first level detector 120 and to a first input of an absolute value or amplitude detecting circuit 250. The output of second I&D filter 200 is coupled to the input of a second level detector 220 and to a second input of absolute value circuit 250.

The first and second integrated output signals or filtered recovered modulation signal from first and second I&D circuits 100 and 200, respectively, supplied to the inputs of first and second level detector means 120 and 220 respectively, are in analog form and are "squared-up" by level detectors 120 and 220, respectively. The sharply-transitioning first and second recovered digital modulation waveform or first and second level detected output signal available at the outputs of first and second level detectors 120 and 220, respectively, are supplied to the first and second inputs, respectively, of first and second switch circuits 140 and 240, respectively. The outputs of first and second level detectors 120 and 220 are also coupled to third and fourth inputs of absolute value circuit 250 and the output of first level detector 120 is also coupled to a first input of a data select circuit 145. The circuitry to determine the channel having the larger signal, which is designated the data channel, and to determine the channel having the smaller signal, which is designated the servo channel, is later described in conjunction with the circuit of FIGS. 2-7. The data signal is available at the output of first switch circuit 140 and the servo signal is available at the output of second switch circuit 240.

A fifth input of absolute value circuit 250 is coupled to the output of baud synch circuit 85 whereat the AGC latch signal is available. The AGC latch signal, which is also provided to AGC circuit 50, is low at the beginning of the received message but changes to a high at the end of the preamble or beginning of the received data in order to inhibit any changes in the selection of the servo and data channels and in the AGC voltage, during the interval of the received data.

The output of absolute value circuit 250 is coupled to a second input of data select circuit 145. When absolute value circuit 250 determines that the I channel has the larger absolute value signal, the first level detected output signal from first level detector means 120 is coupled to the output of first switch means 140, thus providing the first level detected output signal as the data signal thereat, and the second level detected output signal from second level detector means 220 is coupled to the output of second switch means 240, thus providing the second level detected output signal as the servo signal thereat.

When absolute value circuit 250 determines that the Q channel has the larger absolute value signal, the first level detected output signal from first level detector means 120 is coupled to the output of second switch means 240, thus providing the first level detected output signal as the servo signal thereat, and the second level detected output signal from second level detector means 220 is coupled to the output of first switch means 140 thus providing the second level detected output signal as the data signal thereat.

Thus absolute value circuit 250, first and second level detector means 120 and 220, first and second switch means 140 and 240 and data select means 145 cooperate to select the first or second integrated output signal from first or second I&D filter means 100 and 200, respectively, whichever has the larger absolute value, in order to provide the selected larger signal as the data signal available at the output of first switch means 140, and also cooperate to select the first or second integrated output signal from first or second I&D filter means 100 and 200, respectively, whichever has the smaller absolute value, in order to provide the selected smaller signal as the servo signal available at the output of second switch means 240. The AGC latch signal input to absolute value circuit 250 prevents the coupling of first and second switch means 140 and 240, respectively, from changing during the data interval in the received message.

The output of first switch means 140 is coupled to a first input of polarity restoration circuit 70. Polarity restoration circuit 70 establishes the sense of the received data. The data sense is phase dependent and the phase of the data may detrimentally be changed in the communication network between the output of the transmitter (not shown) and the input to the receiver of the present invention, by variables such as line delays. In order to establish the desired data sense, the last transmitted bit of the message preamble, which is the bit immediately preceding the message data, is preselected to always be a false or logic level low. The AGC latch signal provided to a second input of polarity restoration circuit 70 will change state at the end of the preamble, causing the value of the last bit of the message preamble to be stored therein. The AGC latch signal remains constant during the entire received message data interval, thus maintaining the sense of the last preamble bit stored in polarity restoration circuit 70. The data signal coupled to the first input of polarity restoration circuit 70 is internally compared with the sense of the last preamble bit stored therein to provide a digitally encoded data string having the sense or polarity of the transmitted data, available at the output of polarity restoration circuit 70. The data signal output of polarity restoration circuit 70 is coupled to a first input of data latch means 160. The baud clock signal $f_b$, being of the data rate, e.g. 30 Hz, is supplied to a second input of data latch means 160 from frequency means (not shown) which may be a microprocessor controller. In one configuration, the receiver of the present invention receives transmissions from a remote interrogating or commanding transmitter. The transmitter (not shown) and receiver of the present invention are coordinated by synchronizing means or sending control unit (SCU) having a microprocessor and commanding transmitter (not shown). The remote transmitter does not send a message until commanded to do so by a command signal from the SCU. When the remote transmitter does respond, its transmission is synchronized to the SCU command signal. The SCU therefore determines exactly when the received message and each bit therein starts and generates baud clock signal $f_b$ and start count enable signal $\overline{IBRG}$ which are supplied to the receiver of the present invention. The operation of the SCU is explained in greater detail in the previously cited patents which are incorporated herein by reference. The data signal is only valid at the end of each data bit interval because only then have first and second I&D filter means 100 and 200, respectively, completed their integration to remove harmonic noise. Therefore, the data signal is sampled only at the end of a bit interval by baud clock signal $f_b$ supplied to data latch means 160, and the resulting recovered data signal, available at the output thereof, remains constant until the next bit time interval is ended. Thus the data value available at the first input of data latch means 160 is provided to the output thereof at the end of each data bit interval.

The output of first switch means 140 is also coupled to a first input of multiplier means 90, and the output of second switch means 240 is coupled to a second input of multiplier means 90, wherein the data and servo signals provided to the first and second inputs thereof are multiplied. The product of servo signal is supplied to the output of multiplier means 90 wherefrom it is supplied to a first input of phase control means 95. The multiplication of the data and servo signal is necessary in order to remove any polarity reversals from the servo signal caused by undesired phase shifts of the received data and thereby to maintain the proper servo loop polarity of the servo control signal available at the output of servo latch means 260. The polarity of the servo control signal indicates whether to speed up or slow down the local oscillator frequency with respect to the received bit rate. When the phase of the data signal available at the output of first switch means 140 changes, the phase of the data signal supplied to the input of multiplier means 90 likewise changes. Thus if the phase of the received signal is switched 180° between bauds, as may be the case when data is being transmitted, both input signals to multiplier means 90 will reverse polarity so that the output signal available therefrom will remain the same as if no phase shift due to an undesired phase shift of the received data had occurred.

The output of multiplier means 90 is coupled to a first input of phase control means 95. A second input of phase control means 95 is connected to a third output of data select means 145. Thus when the center of the positive half cycle of the received signal lags the positive transition of the local oscillator signal LOI by 45° and leads the positive transition of the local oscillator signal LOQ by 45°, the output signal available at the output of first I&D filter means 100 may be a positive voltage and the output signal available at the output of second I&D filter means 200 may be a negative voltage of substantially the same magnitude. In this case, the absolute value circuit 250 might select either signal available at the output of first or second I&D filter means 100 or 200, respectively, to be the data signal, with the other signal selected to be the servo signal. The polarities of the signals supplied to the first and second inputs of multiplier means 90 will be the same in either instance. However, in this case, it is desired to slow down the local oscillator if channel I using the local oscillator signal LOI is selected as the servo channel and to speed up the local oscillator if channel Q using local oscillator signal LOQ is selected as the servo channel, in order to move the positive transition of the local oscillator signal LOI or LOQ for the channel selected as the servo channel, to the center of the positive half-cycle of the received signal with a minimum amount of phase shift in the local oscillator signals. Phase control means 95 determines, in accordance with the above criteria, whether the local oscillator signals LOI and LOQ should be speeded up or slowed down.

The output from phase control means 95 is coupled to a first input of servo latch means 260. A second input of servo latch means 260 is supplied with the baud clock signal $f_b$. The servo signal is only valid at the end of each data bit interval because only then have first and second I&D filter means 100 and 200, respectively, completed their integration to remove harmonic noise. Therefore, the servo signal is sampled only at the end of a bit interval by baud clock signal $f_b$ supplied to servo latch means 260 and the resulting servo control signal, available at the output thereof, remains constant until the next bit time interval is ended. Thus the servo value available at the first input of servo latch means 260 is provided to the output thereof at the end of each data bit.

The output of servo latch means 260 is connected to a first input of servo circuit 130. The value of the servo control signal provided to the first input of servo circuit 130 as a binary encoded signal determines whether the local oscillator frequency is to speed up or slow down with respect to the received carrier frequency in order to match the received carrier frequency and thereby enable the receiver to act substantially as a synchronous receiver when the frequencies are equal.

The local oscillator signals LOI and LOQ are generated by frequency arithmetic techniques. A reference frequency signal $F_{ref}$ is supplied to a first input of divider circuit 110. The reference frequency signal $F_{ref}$ may be generated by means described in U.S. Pat. No. 4,310,905, incorporated herein by reference. The frequency of reference signal $F_{ref}$ is chosen to be a nominal 983,040 Hz square wave which is the 16,834th, i.e. $2^{14}$, harmonic of the prevailing power frequency (60 Hz). In divider circuit 110, reference signal $F_{ref}$ is multiplied by X/512, wherein X is selected to be the Xth harmonic of the subharmonic (30 Hz) of the prevailing power frequency necessary to create a product or local oscillator reference signal $f_m$ having the desired local oscillator reference frequency. The frequency of the local oscillator reference signal $f_m$ output of divider circuit 110 is selected to be about 64, i.e. $2^6$, times the desired local oscillator frequency. The value of X is supplied in binary encoded form to a second input of divider circuit 110 from select circuit 190 and is selected to produce a local oscillator frequency LOI and LOQ which is nominally the same as the frequency of the received carrier.

Select circuit 190 comprises a plurality of switching means, each for providing an alternative voltage level value to a corresponding output (shown as a single output for convenience) of select circuit 190. Each output of select circuit 190 is connected to an input, which in turn is connected to a corresponding scaler port, of divider circuit 110. The voltages thus coupled to the scaler ports of divider citcuit 110 from select circuit 190, determine the value of X, the multiplication factor of divider circuit 110 wherein X is less than the denominator of divider circuit 110.

The output of divider circuit 110 is coupled to a second input of servo circuit 130. Frequency generating means 150 supplies a decode signal in binary encoded form to a third input of servo circuit 130. Servo circuit 130 functions to add or subtract transitions from local oscillator reference signal $f_m$, available at the second input of servo circuit 130, as a function of the states of the servo control signal and the decode signal available at the first and third inputs of servo circuit 130, respectively. Thus the frequency of the local oscillator modified reference signal $f_a$ available at the output of servo circuit 130 is the frequency of the local oscillator reference signal $f_m$ at the first input of servo circuit 130 plus and/or minus transitions added thereto and/or subtracted therefrom, respectively, by servo circuit 130.

Local oscillator modified reference signal $f_a$, available at the output of servo circuit 130, is provided to the input of frequency generating circuit 150, wherein local oscillator modified reference signal $f_a$ is divided to form two signals having a frequency of $f_a/N$ and $f_a/2N$. The value of N is selected such that the frequency $f_a/2N$ will nominally be the desired frequency of the local oscillator signal LOI. In a configuration of the receiver of the present invention, N is selected to be 32 and 2N is therefore 64. Output signal $f_a/2N$, from frequency generating circuit 150, is coupled to a first input of quadrature frequency generating circuit 170 and is also supplied to first mixer means 60 as the local oscillator signal LOI. Output signal $f_a/N$ from frequency generating circuit 150 is coupled to a second input of quadrature frequency generating circuit 170. The output of quadrature frequency generating circuit 170 is supplied to second mixer means 160 as the local oscillator signal LOQ. Local oscillator signal LOQ is made to lag local oscillator signal LOI by 90° in quadrature frequency generating circuit 170.

Thus, a received data signal, having a preamble of insufficient duration to permit total synchronous detection of the message data is divided into two channels by the receiver shown in FIGS. 1A and 1B. The receiver selects the channel having the larger signal to be the data channel and begins detecting bits immediately, with a slight reduction in signal-to-noise ratio over a synchronous detector. The channel having the smaller signal is selected as the servo channel and generates an error or servo control signal which causes the local oscillator frequency to increase or decrease in order to move the local oscillator signal into phase coincidence with the received RF carrier signal. Since the servo system operates to change the local oscillator frequency in discrete steps, the local oscillator frequency will tend to fluctuate about the desired frequency. However, the excursions from the desired frequency are insignificant since the frequencies are substantially equal to the received frequency and the discrete step frequency changes are relatively small. Thus any need to reverse the direction of the local oscillator frequency will occur within one cycle of the baud clock.

As the received message proceeds, the phase of the local oscillator approaches that of the received RF carrier, which improves the signal-to-noise ratio. The local oscillator phase will continue to change until it is substantially equal to the phase of the received RF carrier at which time the receiver will be operating as a phase shift keyed receiver with synchronous detection which has a better signal-to-noise performance than a differential phase shift keyed receiver. Since the transition to synchronous detection will generally occur early in the received message data time, the majority of the message data is synchronously detected and thus on a message data basis, the receiver will have a signal-to-noise performance closely approximating that of a synchronous phase shift keyed receiver.

Figure 2:
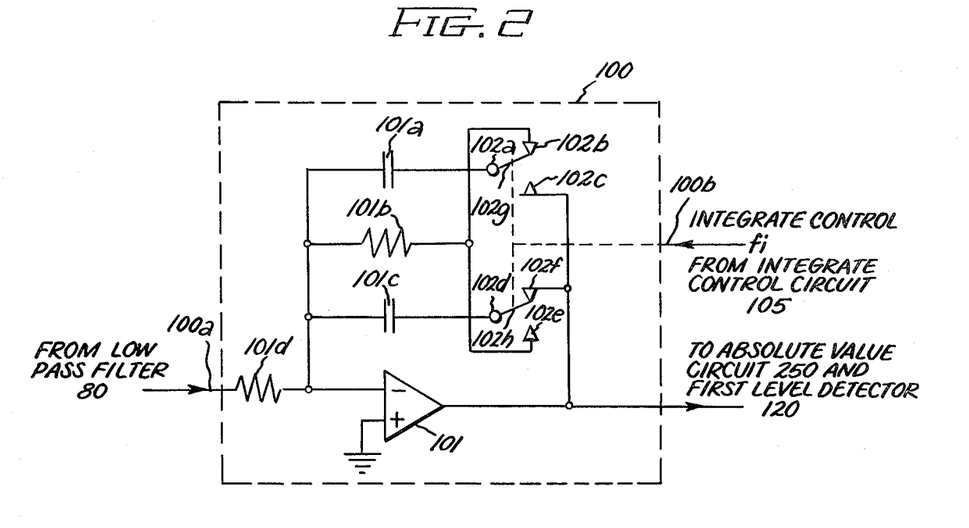
FIG. 2 is a schematic diagram of an integrate and dump (I&D) filter made in accordance with the present invention.

Certain components of the receiver shown in FIGS. 1A and 1B are illustrated in greater detail in FIGS. 2–7. First and second integrate and dump (I&D) filter means 100 and 200, respectively, are identical and include corresponding equivalent components. For simplicity, therefore, FIG. 2 illustrates only first I&D filter means 100 and its respective components.

As shown in FIG. 2, input 100a of first I&D filter means 100 connects the output of low pass filter 80 to an integrating resistor 101d of I&D filter 100. I&D filter 100 comprises operational amplifier 101, integrating capacitors 101a and 101c, discharge resistor 101b and switch or exchanging means 102, such as an electronic switch. The non-inverting input of operational amplifier 101 is connected to ground reference potential.

Contactor 102g L of switch means 102 connects terminal 102a to either terminal 102b or 102c and contactor 102h connects terminal 102d to either terminal 102d or 102f. Contactors 102g and 102h are arranged to switch at the same time and to connect terminals 102a to 102b and terminals 102d to 102f at the same time. Likewise, terminals 102a and 102c and terminals 102d and 102e are connected at the same time. Thus either integrating capacitor 101a or 101c is switched to be connected between the inverting input and output of operational amplifier 101 in the integration mode, as a function of the state of contactors 102g and 102h of switch means 102. Resistor 101b is switched to be connected in parallel with the capacitor 101a or 101c not connected across operational amplifier 101, thus allowing the non-connected capacitor to discharge through resistor 101b in order to permit the non-connected capacitor to be used in a subsequent integration. The value of resistor 101b is selected to ensure that the discharging capacitor will be totally discharged during the discharge period.

Capacitors 101a and 101c will alternately be switched between the integrate and discharge mode, remaining in each mode 1/30 second and thus establishing the integration interval of 1/30 second. The values of resistor 101d and of capacitors 101a and 101c, which have the same value, are selected so that I&D circuit 103 will not saturate on the largest bandpass filtered modulated carrier output signal available at the output of bandpass filter means 40 during the integration interval. Any frequency component with a period of 1/30 second will integrate to zero at the end of the integration interval and therefore will not produce an output signal. Thus all harmonics of the power frequency are removed by I&D filter means 100. The output of operational amplifier 101 constitutes the output of first I&D filter means 100 and is connected to the first input of absolute value circuit 250 and to the input of first level detector 120.

Switching control for switch means 102 is provided by the integrate control signal $f_i$, available at input 100b of I&D filter means 100. Integrate control signal $f_i$ is synchronized to the baud clock signal $f_b$ and is available at output 105b of integrate control 105.

Figure 3:
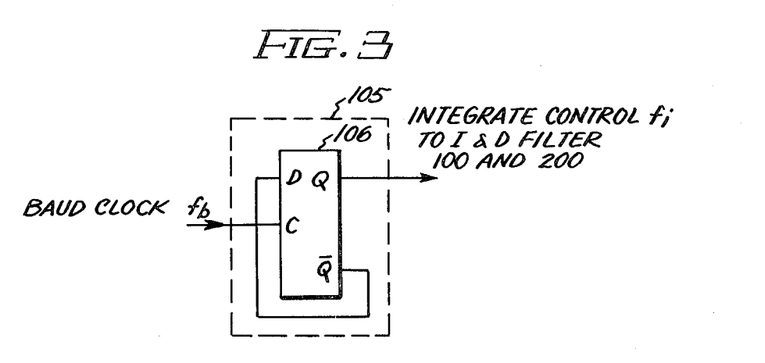
FIG. 3 is a schematic diagram of an integrate control circuit made in accordance with the present invention.

Integrate control circuit 105 as shown in FIG. 3 comprises a D-type flip-flop logic element 106, which may be part of a single CMOS 4042 type integrated circuit or the like, having the data D input and $\overline{Q}$ output thereof connected together. The clock C input of flip-flop element 106, which constitutes the input of integrate control circuit 105, receives the baud clock signal $f_b$ thereat.

The Q output of flip-flop element 106 constitutes the output of integrate control circuit 105 and is connected to input 100b of I&D filter means 100 shown in FIG. 2, thus providing the integrate control signal $f_i$, having a frequency one-half the baud clock signal $f_b$, thereat. Baud clock signal $f_b$ frequency is typically 30 Hz and thus the integrate control signal $f_i$ frequency is typically 15 Hz. Integrate control signal $f_i$ is provided from the circuit of FIG. 3 to switch means 102 of I&D filter 100, shown in FIG. 2, causing contactors 102g and 102h to alternately connect capacitors 101a and 101c, respectively, in the integrate mode with operational amplifier 101 during each half cycle of the integrate control $f_i$.

Figure 4:
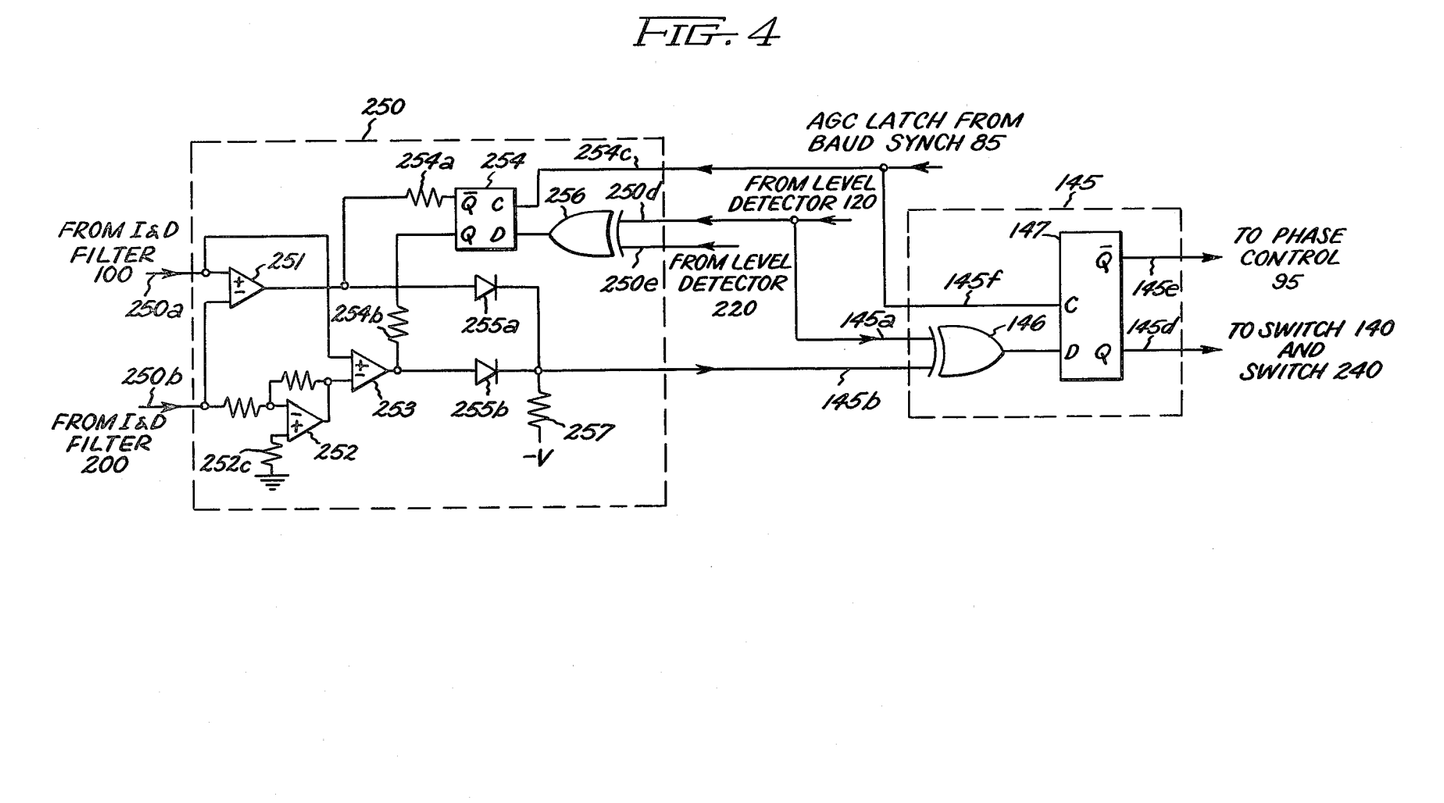
FIG. 4 is a schematic diagram of an absolute value and a data select circuit made in accordance with the present invention.

Referring to FIG. 4, the circuitry to select the channel having the larger signal, which is designated the data channel, and to select the channel having the smaller signal, which is designated the servo channel, will now be described. The outputs of first and second I&D filter means 100 and 200, respectively, are connected to inputs 250a and 250b of absolute value circuit 250, respectively. Inputs 250d and 250e of absolute value circuit 250, connected to the outputs of first and second level detectors 120 and 220, respectively, are each connected to a respective input of exclusive-OR gate 256. The output of exclusive-OR gate 256 is connected to a data D input of a D-type flip-flop logic element 254. The logic output level of exclusive-OR gate 256 is high or true if the first and second level detected output signals available at inputs 250d and 250e, respectively, are not of the same polarity. Otherwise the logic level output of gate 256 is low or false. If CMOS logic circuits are used, a high logic state is indicated by a positive voltage and a low logic state is indicated by a negative voltage.

Assume that the output of gate 256 is high. Clock C input of flip-flop element 254 receives the AGC latch signal, which is low at the beginning of the received message. With a low signal on clock C input of flip-flop element 254, a high signal on data D input thereto will cause the Q output thereof to be set to a high logic level and the $\overline{Q}$ output thereof to be set to a low logic level. The $\overline{Q}$ output of flip-flop element 254 is connected to the output of first level comparator 251 through a series resistor 254a and the Q output of flip-flop element 254 is connected to the output of second level comparator 253 through a series resistor 254b. First and second level comparators 251 and 253, which may be part of a LM139 type integrated circuit or the like, are open collector devices having no internal pull-up resistors on their outputs. Open collector devices have an output transistor connected in the common emitter configuration, wherein there is no internal coupling from a voltage source to the collector of the output transistor. Thus an external or pull-up resistor is needed to couple the collector to a source of voltage so that current can flow in the collector. Resistors 254a and 254b act as pull-up resistors, allowing a signal to appear at the output of level comparator 251 and 253 when either the $\overline{Q}$ or Q output of flip-flop element 254 is a logic level high, respectively, and disabling the output of level detectors 251 or 253 when the $\overline{Q}$ or Q output signal of flip-flop element 254 is a logic level low, respectively. Diodes 255a and 255b serve to isolate the first and second level comparator outputs of first and second level comparators 251 and 253, respectively, from each other. The common node at the cathode of diodes 255a and 255b is connected to a source of negative operating voltage potential through resistor 257 and constitutes the output of absolute value circuit 250. If the output of either first or second level comparator 251 or 253, respectively, is a logic high, then a logic high is provided by absolute value detector 250, otherwise a logic low is produced thereby.

Input 250a of absolute value circuit 250 is connected to the non-inverting input of first and second level comparators 251 and 253. Input 250b of absolute value circuit 250 is connected to the inverting input of first level comparator 251 and to a resistor 252b. The other end of resistor 252b is connected to the inverting input of an operational amplifier 252. An offset resistor 252c is connected between the non-inverting input of an operational amplifier 252 and ground potential and a feedback resistor 252a is connected between the non-inverting input and output of operational amplifier 252. Values for resistors 252a, 252b and 252c are chosen such that operational amplifier 252 operates as a unity gain inverter. The output of operational amplifier 252 is connected to the inverting input of second level comparator 253.

Assuming the Q output signal of flip-flop element is a logic level high and the $\overline{Q}$ output signal of flip-flop 254 is a logic level low, the output of first level comparator 251 will be continuously low. Second level comparator 253 will compare the magnitude of the integrated output signal from first I&D filter means 100 supplied to the non-inverting input thereof with the inverted magnitude of the integrated output signal from second I&D filter means 200 supplied to the inverting input thereof from the output of operational amplifier 252. The input signals to second level comparator 253 will be of the same polarity, a condition necessary to establish the assumed state of the Q (high) and $\overline{Q}$ (low) output signals of flip-flop 254. If the integrated output signal from first I&D filter means 100 is positive, the output signal of second level comparator 253 will be high if the integrated output signal from first I&D filter means 100 is greater than the integrated output signal from second I&D filter means 200, and low otherwise.

The rapidly transitioning level detected output available at the output of first level detector 120 is coupled to input 145a of data select means 145. Input 145a is connected to one input of a two-input exclusive-OR gate 146. The other input of exclusive-OR gate 146 is provided with an absolute value signal summed from the output of first and second level comparators 251 and 253 through blocking diodes 255a and 255b, respectively and the signal level thereon is indicative of which recovered modulation signal has the greater absolute value.

When the output signal from first I&D filter means 100 is positive, the output signal of first level detector means 120 coupled to an input of exclusive-OR gate 146 of data select circuit 145 is a logic level high. Further, if the output signal from first I&D filter means 100 is greater than the output signal from second I&D filter means 200, the output signal of second level comparator 253 of absolute value detector circuit 250, which is coupled to the other input of exclusive-OR gate 146, is high. With both inputs to the exclusive-OR gate 146 high, the output signal therefrom, which is coupled to the data D input of D-type flip-flop logic element 147, is low. The AGC latch signal, which is coupled to the clock C input of flip-flop element 147, will cause the low signal on data D input thereof to be transferred to the Q output of flip-flop element 147 while the AGC latch signal is a logic low. The Q output signal of flip-flop element 147 is provided to first and second switch means 140 and 240, respectively, (see FIG. 1) to act as a control signal for coupling means therein.

When the Q output signal of flip-flop element 147 is low, the output signal from first level detector means 120 is coupled through first switch means 140 and thus provides the output signal from first level detector means 120 as the data signal. The output signal from second level detector means 220 is coupled through second switch means 240 and thus provides the output signal from second detector means 220 as the servo signal.

If output signals from first and second level detectors 120 and 220, respectively, are of the same polarity, a low signal is supplied to data D input of flip-flop element 254 from the output of exclusive-OR gate 256. The logic low level of the AGC latch signal coupled to clock C input of flip-flop element 254 simultaneously causes the low signal at data D input thereof to be transferred to the Q output and a high signal to be transferred to the $\overline{Q}$ output thereof. The output from second level comparator 253 is thus disabled and first level comparator 251 compares the amplitude of the output signal from first I&D filter means 100 with the amplitude of the output signal from second I&D filter means 100 is positive, the output signal of first level comparator 251 will be positive if the output signal from first I&D filter means 100 is greater than the output signal from second I&D filter means 200. The output signal of first level comparator 251 is coupled through blocking diode 255a to an input of exclusive-OR gate 146. The operation of exclusive-OR gate 146, flip-flop element 147 and first and second switch means 140 and 240, respectively, is the same as hereinbefore described.

Because the AGC latch signal is a logic level high starting at the end of the received message preamble and continuing during the received data interval, the AGC latch signal supplied to the clock C input of D-type flip-flop element 147 prevents the Q and $\overline{Q}$ outputs thereof from changing during the data interval of the received message, thus holding the coupling of first and second switch means 140 and 240, respectively, constant for the duration of the received data interval.

Level detectors 120 and 220, may each be a type 4741 integrated circuit or the like. D-type flip-flop logic elements 147 and 254 may be part of a single CMOS 4042 type integrated circuit or the like and exclusive-OR gates 146 and 256 may be part of a single 4070 type integrated circuit or the like.

Figure 5:
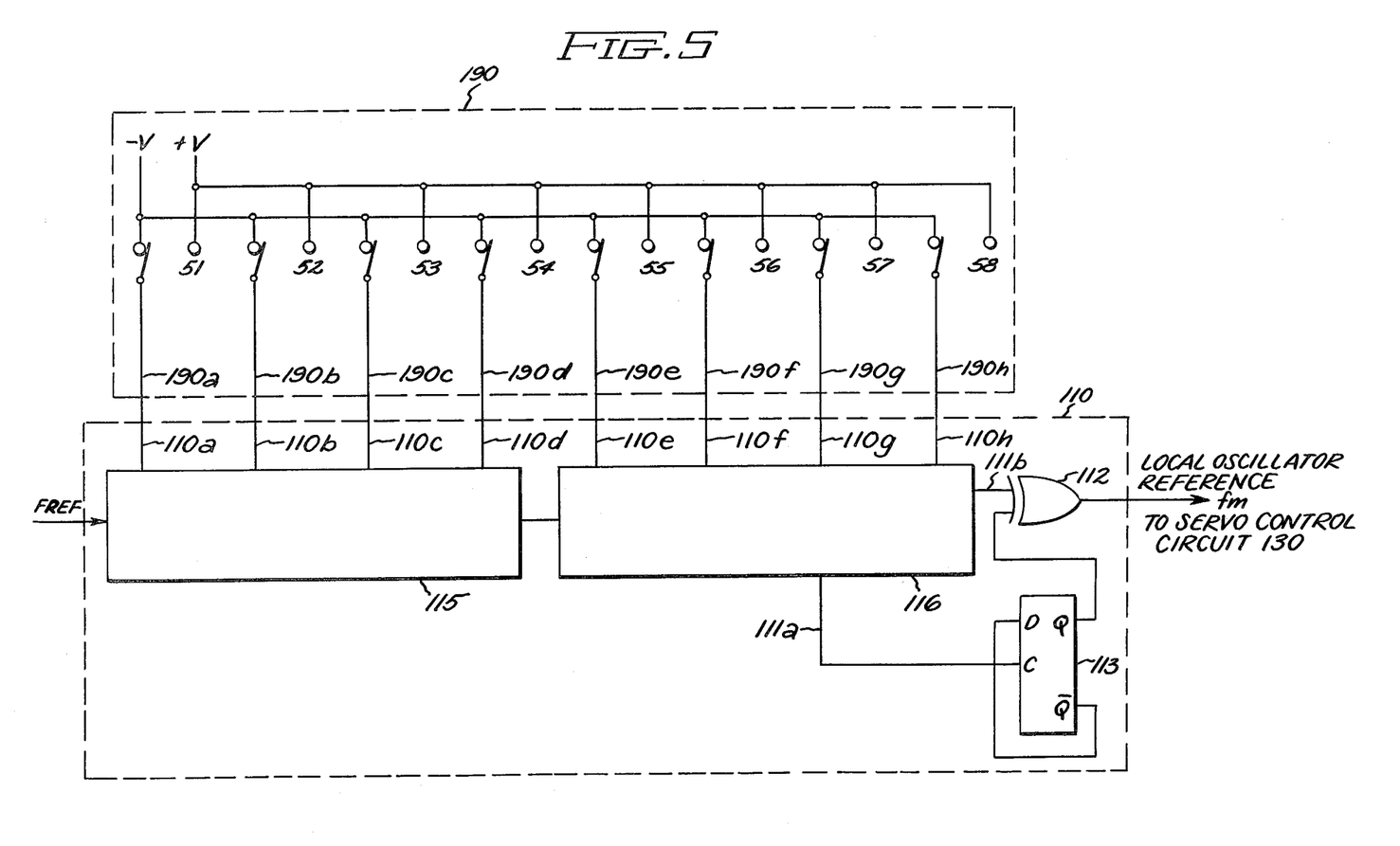
FIG. 5 is a schematic diagram of a divider and a select circuit made in accordance with the present invention.

FIG. 5 illustrates how the local oscillator reference signal $f_m$ is generated by frequency arithmetic techniques. Divider circuit 110 comprises multipliers 115 and 116 which may be CMOS type 4089 integrated circuit rate multipliers or the like, connected in series, a two-input exclusive-OR gate 112 and D-type flip-flop logic element 113. Flip-flop element 113 has the clock C input thereof connected to a first output 111a of multiplier 116 and the data D input and $\overline{Q}$ output thereof connected together. The Q output of flip-flop logic element 113 is connected to a first input of exclusive-OR gate 112 and a second output 111b of multiplier 116 is connected to a second input of exclusive-OR gate 112. Flip-flop logic element 113 saves the addition of a third rate multiplier to divider 110 as would otherwise be necessary since two 4-input rate multipliers connected in series are only capable of forming a divisor of 256, i.e. $2^8$. Flip-flop logic element 113 adds an additional division by 1/512 every other cycle of divider 110 in order that an odd number numerator of an operand having a denominator of 512 may be effected. The output from exclusive-OR gate 112 is a local oscillator signal $f_m$ having a frequency which is $(X/512) \cdot F_{ref}$ and is selected to be nominally 64 times the desired local oscillator frequency in a configuration of the present invention.

The function representing factor X is coupled to inputs 110a–h of select means 190, respectively. Factor X is the numerator of the multiplication factor of rate multipliers 115 and 116 wherein X is less than the denominator of the multiplication factor, causing rate multipliers 115 and 116 to multiply by a fraction having a value less than one. Select means 190 comprises a plurality of switches S1–S8 which may alternatively couple a positive operating voltage +V or a negative operating voltage −V to outputs 190a–h thereof, respectively. The signals coupled to outputs 190a–h from select means 190 provide voltages to the scaling ports of the multipliers 115 and 116 of divider 110 in order to obtain the desired multiplication factor X.

Figure 6:
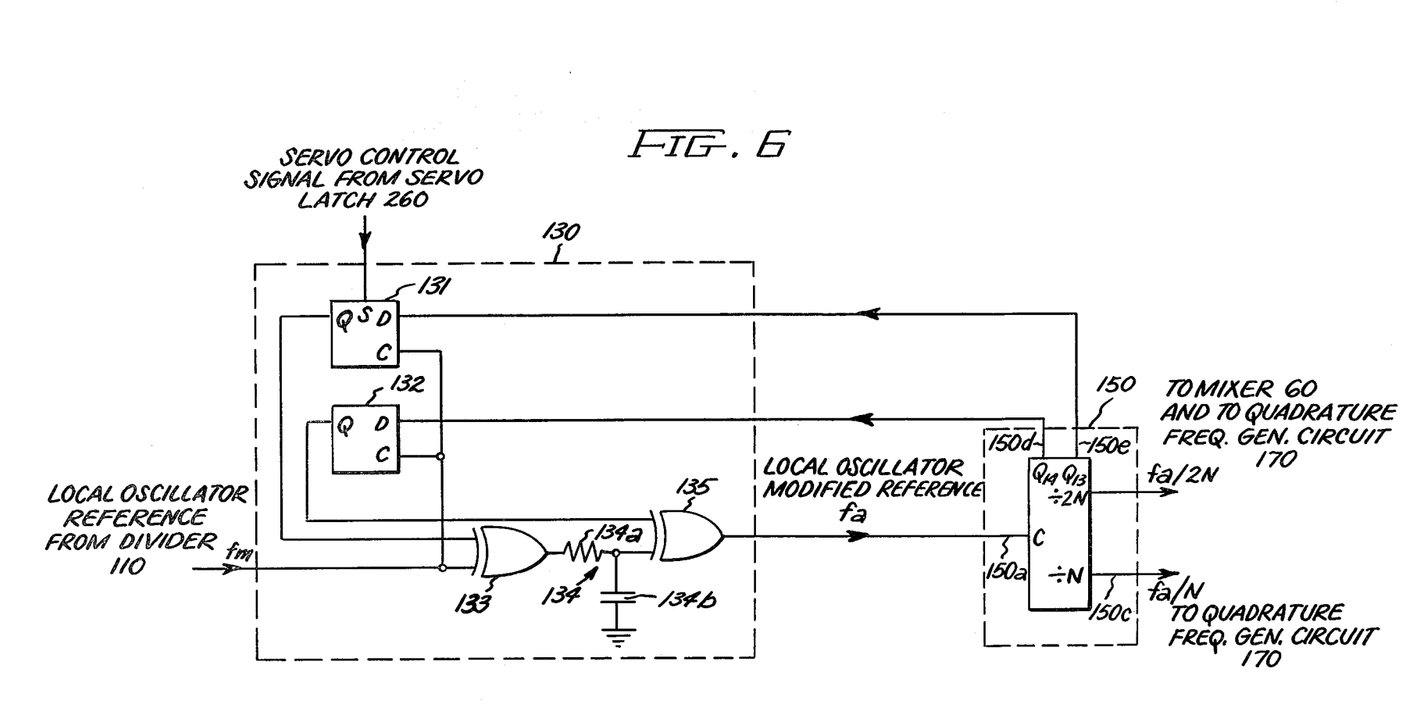
FIG. 6 is a schematic diagram of a servo and a frequency generating circuit made in accordance with the present invention.

Referring to FIG. 6, the local oscillator reference signal $f_m$ is coupled to clock C inputs of D-type flip-flop logic elements 131 and 132 and to an input of a two-input exclusive-OR gate 133, in servo circuit 130. The output of exclusive-OR gate 133 is connected to a low pass filter 134 including resistor 134c and capacitor 134b.

Frequency generating means 150, which comprises divider means such as a CMOS type 4020 integrated circuit or the like, provides signals, which are divided down from the local oscillator modified reference signal $f_a$, from outputs $Q_{13}$ and $Q_{14}$ thereof to the data D inputs of D-type flip-flop logic elements 131 and 132, respectively.

Components of servo circuit 130 including exclusive-OR gate 133, low pass filter 134 and D-type flip-flop logic element 131 co-act to form a subtraction or perturbation means to remove one transition from the local oscillator reference signal $f_m$, each time a positive transition occurs in the signal from output $Q_{13}$. Any change in signal supplied to the data D input of flip-flop element 131 from output $Q_{13}$ of divider 151 is synchronized with the local oscillator reference signal $f_m$ supplied to clock C input of flip-flop logic element 131, such that the signal coupled to the data D input thereof will be transferred to the Q output thereof at positive transitions of the clock C input signal thereto. The Q output of flip-flop element 131 is connected to a second input of exclusive-OR gate 133. The two inputs to exclusive-OR gate 133, will transition simultaneously on the first positive transition of local oscillator reference signal $f_m$ after the signal from output $Q_{13}$ has transitioned, thus avoiding a transition at the output of exclusive-OR gate 133 which effectively eliminates one transition from the local oscillator reference signal $f_m$. This subtraction occurs only if the servo control signal provided to the set S input of flip-flop element 131 is a logic level low. If the servo control signal at set S input of flip-flop element 131 is a logic level high, the true Q output thereof is maintained in the set or logic level high state, thus preventing the true Q output signal from changing and a pulse subtraction from occurring.

Low pass filter 134 is provided to eliminate any very short pulses which may occur due to non-simultaneous transitions at the inputs of exclusive-OR gate 133. Non-simultaneous transitions at the inputs of exclusive-OR gate 133 may be caused by the delay in transferring data from the data D input to the Q output of flip-flop element 131 at the transition of the signal coupled to the clock C input thereof. Filter 134 also delays the output signal of exclusive-OR gate 133 so that the output signal thereof does not transition simultaneously with the Q output signal of flip-flop element 132.

Components of servo circuit 130 including D-type flip-flip logic element 132 and exclusive-OR gate 135 co-act to form an addition or perturbation means to add a transition to the signal from the output of low pass filter 134 each time a transition occurs in the signal from output $Q_{14}$ of divider means 151, (which occurs at each negative transition of the signal from output $Q_{13}$ thereof). The signal from the $Q_{14}$ output of divider means 151 is coupled to the data-D input of flip-flop element 132. The Q output of flip-flop element 132 is connected to a first input of a two-input exclusive-OR gate 135, having a second input thereof connected to the output of low pass filter 134 at the junction of resistor 134a and capacitor 134b thereof.

Since local oscillator reference signal $f_m$ is provided to the clock C input of flip-flop element 132, the transitions of the signal from the $Q_{14}$ output of divider means 150 provided to data D input of flip-flop element 132 are transferred to the Q output thereof at a positive transition of the local oscillator reference signal $f_m$, thus synchronizing the Q output changes thereof to the local oscillator reference signal $f_m$. Because of the time delay in low pass filter 134, the transitions of the input signals to exclusive-OR gate 135 are not simultaneous and transitions will be added to the signal at the output of low pass filter 134. Thus the frequency of the local oscillator modified reference signal $f_a$ at the output of exclusive-OR gate 135 is the frequency of the local oscillator reference signal $f_m$ at input 130a of servo circuit 130 plus the transitions added by exclusive-OR gate 135 and less transitions subtracted by exclusive-OR gate 133. Output signals at terminals $Q_{14}$ and $\overline{Q_{14}}$ of divider means 150 will typically provide 26–37 extra transitions in the addition mode and will typically inhibit 52–74 transitions in the subtraction mode for the frequencies of interest of the local oscillator reference signal $f_m$. Thus, in the subtraction mode, two transitions will be cancelled or subtracted for each transition which is added, resulting in a net loss of one transition. In this manner, the local oscillator frequency servo loop operates with discrete rather than continuous feedback.

Local oscillator modified reference signal $f_a$, available at the output of exclusive-OR gate 135, is provided to input 150a of frequency generating means 150, which constitutes divider means such as a binary divider, wherein local oscillator modified reference signal $f_a$ is divided to form two signals having a frequency of $f_a/N$ and $f_a/2N$, respectively. The value of N is selected, i.e., output stages or decodes of frequency generating means 150 chosen, such that the frequency $f_a/2N$ will nominally be the desired frequency of the local oscillator signal LOI.

Assuming $F_{ref}$ is 983040, in the addition mode, the transition rate of the local oscillator signals is:

$$LOI = LOQ = \frac{983040}{64} \cdot \frac{X}{512} \cdot \frac{16384}{16383} \text{ positive transitions per second}$$

and in the subtraction mode, the transition rate of the local oscillator signals is:

$$LOI = LOQ = \frac{983040}{64} \cdot \frac{X}{512} \cdot \frac{134217728}{134225920} \text{ positive transitions per second}$$

As an example, wherein the nominal local oscillator frequency is 6630 Hz, X is equal to 221 and the local oscillator frequencies are approximately 6630.4 Hz in the addition mode and 6629.6 Hz in the subtraction mode. Thus, servo circuit 130 acts to increase the frequency of the local oscillator signal and thereby advance the phase thereof or to decrease the frequency of the local oscillator signal and thereby retard the phase thereof, with respect to the received carrier frequency, in order to move the local oscillator signals LOI and LOQ into phase lock with the received carrier signal.

Figure 7:
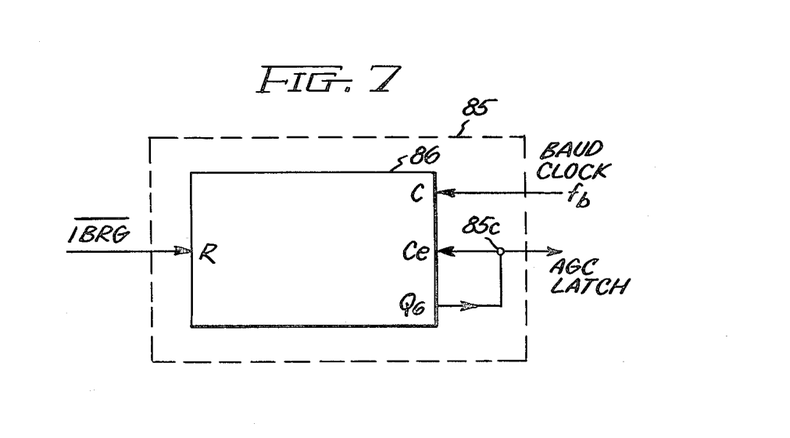
FIG. 7 is a schematic diagram of a baud synch circuit made in accordance with the present invention.

Referring to FIG. 7, the timing signal or internal synchronization signal for the receiver of the present invention is generated in the baud synch circuit 85 comprising a counter 86 which circuit provides the AGC latch signal at output 85c thereof. Start count enable signal $\overline{IBRG}$, which is received from the sending control unit as hereinbefore explained and is coupled to reset input R of counter 86, transitions to a logic level low at the beginning of the received message, thus enabling counter 86. Counter 86 may be a CMOS type 4022 integrated circuit or the like. The baud clock signal $f_b$ coupled to the clock C input of counter 86 occurs at the received data bit rate which is typically 30 Hz. Counter 86 keeps track of the number of message bits received after the receipt of the start count enable signal $\overline{IBRG}$, and at the beginning of the first message data bit, predetermined to be the seventh bit in a configuration of the present receiver (i.e. after six bits of preamble), decode signal at output $Q_6$ of counter 86 transitions to a logic level high. This decode signal, which provides the AGC latch signal, is also provided to the count enable $C_e$ input of counter 86. When the signal at output $Q_6$ is a logic level high, counter 86 is disabled by the input signal to terminal $C_e$ and the AGC latch signal is maintained as a logic level high, thus maintaining the Q output signals of the D-type flip-flop elements 147 and 254, shown in FIG. 4, at the value of the data D input of the respective flip-flop elements occurring at the time immediately preceding the logic level low-to-high transition of the AGC latch signal. The selection of data and servo channels is thus maintained at the logic level low-to-high transition of the AGC latch signal occurring at the beginning of the received message data. The AGC latch signal is also provided to AGC circuit means 50, as shown in FIG. 1A, in order to prevent the AGC voltage signal at the output thereof, (and thereby the receiver gain), from changing during the integrate time for a data bit interval. A receiver gain change during this interval would degrade harmonic cancellation in the first and second I&D filter means 100 and 200, respectively, causing a reduction in the signal-to-noise performance of the receiver.

Thus has been described a receiver capable of receiving messages in which the message preamble is of insufficient duration to permit a local oscillator signal to be synchronized with the received signal for synchronous detection while maintaining harmonic rejection. Further, the signal-to-noise ratio of the receiver described herein is increased over a receiver employing a differential phase shift detection technique.

Although the preferred embodiments of the present invention have been described and illllustrated, other configurations and modifications will become apparent from the foregoing to one skilled in the art. It is intended that the scope of this invention be limited only by the appended claims.

What is claimed is:

1. A receiver for recovering digital data modulated upon a carrier waveform in a digital communication system comprising:
   (a) first frequency generating means for producing a first local oscillator signal;
   (b) second frequency generating means coupled to said first frequency generating means for producing a second local oscillator signal wherein said first and second local oscillator signals are in quadrature phase relationship with respect to each other;
   (c) mixing means coupled to said first and second frequency generating means, respectively, for mixing the modulated carrier with each of said first and second local oscillator signals to form first and second recovered modulation signals, respectively;
   (d) amplitude detecting means coupled to said mixing means for selecting the larger and smaller of said first and second recovered modulation signals to form a data signal and a servo signal, respectively;
   (e) multiplier means coupled to said amplitude detecting means for multiplying said servo signal by said data signal to form a servo control signal;
   (f) frequency varying means coupled to said first frequency generating means for varying the frequency of said first local oscillator signal in response to said servo control signal; and
   (g) polarity restoration means coupled to said amplitude detecting means for receiving said data signal and for providing a recovered data signal having the same logic sense as the digital data modulated upon the carrier waveform.

2. The receiver of claim 1, wherein said amplitude detecting means comprises:
   (a) first and second level comparator means each having a first input respectively receiving said first recovered modulation signal;
   (b) inverting means having an input and an output for inverting a signal, a second input of said first level comparator means and the input of said inverting means receiving said second recovered modulation signal and the output of said inverting means being coupled to a second input of said second level comparator means;
   (c) digitizing means coupled to said mixing means for converting said first and second recovered modulation signals to first and second rapidly transitioning recovered modulation signals, respectively;
   (d) a first exclusive-OR gate having a first and second input coupled to said digitizing means so as to receive said first and second rapidly transitioning recovered modulation signals, respectively;
   (e) a first flip-flop logic element having a data D input, a Q output and a $\overline{Q}$ output, said flip-flop logic element having the data D input thereto coupled to the output of said first exclusive-OR gate and wherein the Q and $\overline{Q}$ outputs of said flip-flop element are coupled to the outputs of said first and second level comparators, respectively; and
   (f) first and second diode elements having the anodes thereof coupled to the outputs of said first and second level comparators, respectively, and having the cathodes thereof coupled together for providing an absolute value signal indicative of which recovered modulation signal has the greater absolute value.

3. The receiver of claim 2, further comprising:

(a) a second exclusive-OR gate having a first input thereof coupled to the cathode of said first and second diodes, respectively, and having a second input thereof coupled to said digitizing means so as to receive said first rapidly transitioning recovered modulation signal; and (b) a second flip-flop logic element having a data D input coupled to the output of said second exclusive-OR gate.

4. The receiver of claim 3 wherein said first and second flip-flop logic element each includes a clock C input, said receiver further comprising a counter having an output thereof coupled to the clock C inputs of said first and second flip-flop logic elements for providing a disabling signal thereto in response to a system timing signal.

5. The receiver of claim 1 including filtering means coupling said mixing means to said amplitude detecting means for increasing the signal-to-noise ratio in said first and second recovered modulation signals.

6. The receiver of claim 5 wherein said filtering means comprises:

(a) first and second switching means;

(b) first and second capacitive elements coupled to said first switching means;

(c) third and fourth capacitive elements coupled to said second switching means;

(d) a first resistive element coupling said first and second capacitive elements to said mixing means and a second resistive element coupling said third and fourth capacitive elements to said mixing means, so as to charge said first and second capacitive elements with the level of said first recovered modulation signal and to charge said third and fourth capacitive elements with the level of said second recovered modulation signals;

(e) third resistive means coupled to said first switching means so that one of said first and second capacitive elements, respectively, is coupled to said third resistive means; and (f) fourth resistive means coupled to said second switching means so that one of said third and fourth capacitive elements, respectively, is coupled to said fourth resistive means.

7. The receiver of claim 6 further comprising a flip-flop logic element having a data D input, a clock C input, a Q output and a $\overline{Q}$ output, said flip-flop logic element having the data D input thereto coupled to the $\overline{Q}$ output thereof, the clock C input thereto coupled to a system timing signal and the Q output thereof coupled to said first and second switching means for controlling the exchange rate of said first and second switching means, respectively.

8. The receiver of claim 1, further comprising bandpass filtering means coupled to said mixing means for filtering the modulated carrier supplied to said mixing means.

9. The receiver of claim 8, further comprising gain control means coupled to said bandpass filtering means for limiting the amplitude of the modulated carrier supplied to said bandpass filtering means.

10. The receiver as in claim 1, wherein said frequency varying means comprises:

(a) first perturbation means responsive to a reference signal of predetermined frequency for decreasing said predetermined frequency;

(b) second perturbation means responsive to said reference signal for increasing said predetermined frequency, the output of said first perturbation means being coupled to an input of said second perturbation means; and (c) means coupling said multiplier means to said first perturbation means so as to allow said servo control signal to actuate said first perturbation means when the frequency of said first and second local oscillator signals is less than the frequency of said carrier waveform, said first and second perturbation means thereby forming a local oscillator modified reference signal, whereby the output of said second perturbation means, which constitutes the output of said frequency varying means, has said local oscillator modified reference signal available thereat.

11. The receiver of claim 10, wherein said first perturbation means comprises:

(a) a flip-flop logic element having a set S input, a clock C input, a data D input and a Q output, said first flip-flop logic element having the set S input thereto coupled to said multiplier means, the clock C input thereto receiving said reference signal, and the data D input thereto coupled to a first decode output of said first frequency generating means; and (b) an exclusive-OR gate having a first input responsive to said reference signal and a second input coupled to the Q output of said flip-flop logic element, the output of said exclusive-OR gate producing said reference signal at a frequency decreased from said predetermined frequency.

12. The receiver of claim 11, further comprising filtering means coupled to the output of said exclusive-OR gate for lowpass filtering the output thereof.

13. The receiver of claim 10, wherein said second perturbation means comprises:

(a) a flip-flop logic element having a clock C input, a data D input and a Q output, said flip-flop logic element having the clock C input thereto receiving said reference signal, and the data D input thereof coupled to a second decode output of said first frequency generating means; and (b) an exclusive-OR gate having a first input coupled to the output of said first perturbation means and having a second input coupled to said Q output of said flip-flop logic element.

14. The receiver of claim 1 including phase control means coupled to said multiplier means for determining the sense of said servo control signal in response to the recovered modulation signal selected as the data signal.

15. The receiver as in claim 10 further comprising third frequency generating means coupled to said first and second perturbation means for providing said reference signal respectively thereto.

* * * * *